United States Patent
Stolbikov et al.

(10) Patent No.: US 12,386,976 B2
(45) Date of Patent: Aug. 12, 2025

(54) TRANSPARENT WEB CONTENT VALIDATION TREE

(71) Applicant: Lenovo (Singapore) Pte. Ltd., Singapore (SG)

(72) Inventors: Igor Stolbikov, Apex, NC (US); Chunling Han, Beijing (CN); Christian De Hoyos, Morrisville, NC (US); Scott Wentao Li, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 268 days.

(21) Appl. No.: 17/937,926

(22) Filed: Oct. 4, 2022

(65) Prior Publication Data
US 2024/0111875 A1    Apr. 4, 2024

(51) Int. Cl.
*G06F 21/57* (2013.01)

(52) U.S. Cl.
CPC ...... *G06F 21/577* (2013.01); *G06F 2221/034* (2013.01)

(58) Field of Classification Search
CPC .......... G06F 21/51; G06F 21/57; G06F 21/64; G06F 21/128; G06F 21/577; G06F 21/602; G06F 21/645; G06F 2221/034; G06F 16/9566; H04L 9/30; H04L 9/50; H04L 9/3247

USPC .......................................................... 726/25
See application file for complete search history.

(56) References Cited

U.S. PATENT DOCUMENTS

| | | | |
|---|---|---|---|
| 7,930,733 B1* | 4/2011 | Iftode | G06F 21/575 713/168 |
| 10,909,222 B1* | 2/2021 | Fregly | G06F 21/6218 |
| 11,886,557 B1* | 1/2024 | Thanh Tran | G06F 21/31 |
| 2010/0186088 A1* | 7/2010 | Banerjee | H04L 63/1433 709/224 |
| 2015/0033305 A1* | 1/2015 | Shear | G06F 21/53 726/11 |
| 2019/0229920 A1* | 7/2019 | Naqvi | H04L 9/3239 |
| 2020/0042999 A1* | 2/2020 | Zhang | G06Q 20/3825 |
| 2021/0126773 A1* | 4/2021 | Perlman | G06F 16/27 |
| 2023/0102116 A1* | 3/2023 | Chen | G06F 21/64 726/25 |
| 2023/0409755 A1* | 12/2023 | Wentz | G06F 21/645 |
| 2024/0007312 A1* | 1/2024 | Verdian | G06F 21/64 |
| 2024/0154811 A1* | 5/2024 | Ragnoli | H04L 9/3218 |

* cited by examiner

*Primary Examiner* — James N Fiorillo
(74) *Attorney, Agent, or Firm* — Schwegman Lundberg & Woessner, P.A.

(57) ABSTRACT

The management of web page content includes maintaining an auditable log of trust verification relating to the web page content. The management further includes an attestation of a source of the web page content. The attestation relates to a security practice of the source, computer code provided by the source, a reputation of the source, and a history of the source. A modified version of a Verkle Tree is then applied to the auditable log and the attestation of the source.

15 Claims, 3 Drawing Sheets

TRANSPARENT WEB CONTENT VALIDATION TREE

TECHNICAL FIELD

Embodiments described herein generally relate to a transparent web content validation tree, and the use of such a tree to provide efficient validation of the security of web content. Embodiments further generally relate to protection of the web content using Pedersen commitment data. Embodiments still further generally relate to aggregating security commitments across multiple software versions, products, and companies.

BACKGROUND

Most modern web applications are built on a large number of JavaScript modules. Modules that are nested many levels to each other are often third-party hosted. Consequently, a web application provider has limited capacity to control what JavaScript modules are loaded. Standard software composition analysis (SCA) tools that are designed to identify vulnerable components are often useless because their components are uploaded dynamically. If there is malware present or a backdoor exists, the web application provider has few remedies to identify and mitigate the threats.

Standard mitigating controls use content security policies (CSPs). CSPs allow defining explicit policies that will specify allowed origins for all dynamic origins, including scripts, stylesheets, images, fonts, objects, media (audio, video), frames, and even form-actions. However, CSPs are proven to be very hard and difficult to use. They are almost impossible to use with popular JavaScript frameworks such as Angular. Angular requires "unsafe-inline" CSP settings. The situation becomes worse when unsafe scripts are executed within web-enabled applications that run within the Windows® user context. Such applications lack sandboxing, which is standard for Web Browsers. JavaScript within such apps can call OS-level application program interfaces (API), thereby causing a massive compromise of the systems by third-party provided scripts.

CSPs allow the identification of trusted JavaScript modules using hashing. For example, adding 'sha256YpcdPia2p177TdnpnY8avdsWWSqByEKGZBY5iqsLBkSg=' will allow ensuring identification and integrity of the source scripts. Unfortunately, this approach is not easy to sustain. A small change in style will require apps to recreate hashes. This is acceptable for a small number of sources, but not for modern web applications that may contain hundreds of sources.

There is also the nonce version of the CSP inline construct. The nonce-based CSP will generate a random number at runtime, and associate it with every script tag on the web app page. An attacker can't include and run a malicious script on the page because they would need to guess the correct random number for that script. This only works if the number is not guessable and newly generated at runtime for every response. The nonce will help with XSS-type attacks, but it is not efficient against backdoors and malicious scripts.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings.

DETAILED DESCRIPTION

Figure 1:
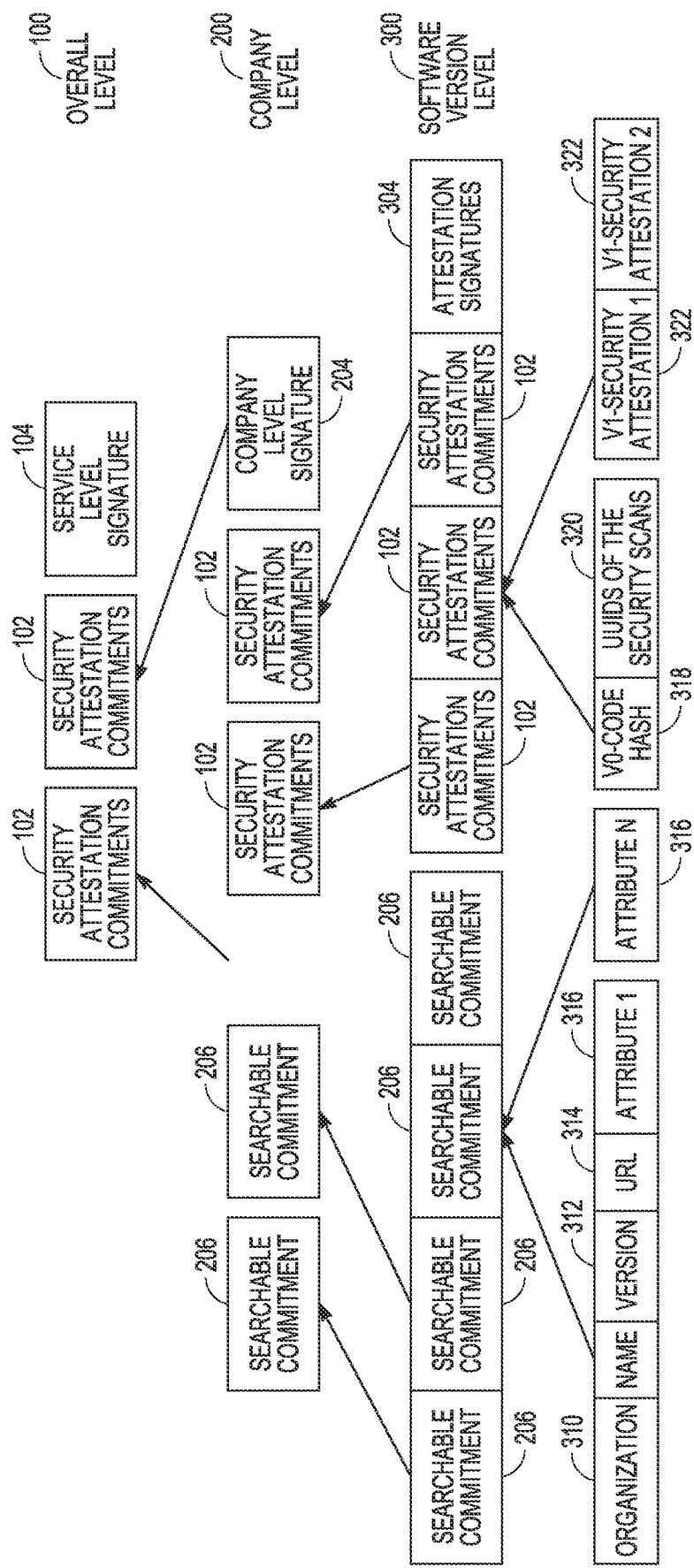
FIG. 1 is a block diagram illustrating an embodiment of a transparent web content validation tree.

Any efficient method of protection and validation of web content should be compliant with several of the following features. The method should ensure the authenticity of the sources of the web content, in particular, the source code. The method should control such sources based on the version and product hashes. The source code should receive a seal of approval by a centralized service. The method should ensure verification of the dependency chaining and validation of the trust for each component of the web content. Any support should be implemented with a set of security headers that is a standard way to pass metadata by web apps. The method should have efficient support for open source and private libraries. The method should provide scans of the products for malware and vulnerabilities, including a verifiable universally unique identifier (UUID) of the scan results. The method should report on the reputation of the vulnerable libraries. There should be an ability to dynamically and efficiently check risks based on criteria of the library chains. The method should provide a status of vendor software patching using the chain approach. The method should use functional encryption. Embodiments of the present disclosure provide one or more of these features.

Specifically, an embodiment is a transparent web content management framework that can be referred to as a Transparent Web Content Verification Tree (TWCVT). The framework provides more efficient methods for companies and other entities to validate the authenticity and integrity of its web content coupled with auditable logs of the trust verification, including an attestation of the vendor on security practices applied as well as code, source and vendor reputation. The framework provides append-only logs of content hashes for each version, along with the attestations related to vulnerabilities, license conditions, security attestations, and source and vendor reputation. The logs are publicly auditable so that it is possible for anyone to verify the correctness of each log and to monitor when new content is added to it.

Since some content may be proprietary, where disclosure of the vulnerabilities may not be desirable by the vendor, embodiments use a modified version of a Verkle Tree to hold that information in a bandwidth-efficient manner. Verkle trees and polynomial commitments are used instead of hashing commitments for Merkle trees. Use of Verkle Trees provides inherent advantages over Merkel implementation due to very large web applications with perhaps thousands of libraries and hundreds of entities being in use simultaneously. Another embodiment uses elliptic curve cryptography (ECC) based Pedersen commitments to build the tree. Extended Verkle trees are used to add effective indexing and searches.

The majority of the web content is identified by one of the following attributes including but not limited to the name of the source code, the content repository URL, the organization, and the version number. In an embodiment, these attributes are searchable indices. All searchable and non-searchable validation attributes are expressed in the form of the Pedersen commitments.

Pedersen commitments allow the creation of a commitment to a value. They may then later open the commitment and verify the value in a manner that binds them to their commitment. Commitments have homomorphic addition/subtraction properties as follows:

$$C1=Commitment(Value1, BF1), C2=Commitment(Value2, BF2)$$

$$C1+C2=Commitment(Value1+Value2, BF1+B2)$$

$$C1-C2=Commitment(Value1-Value2, BF1-BF2)$$

ECC commitments are based on the Elliptic Curve Discrete Logarithm Problem (ECDLP), The curve point C is generated in a unique way using a secret value and a random 256-bit integer r, called the blinding factor. C is a point on the elliptic curve formed by applying the elliptic curve addition operation.

C(S, R)=SG+RH, where EC points multiplications and additions are, used.

It is impossible to derive S from G and R as this is a private point at the curve.

G can be public parameters of the curve, e.g., of secp384k1.

H can be the derivative of G, e.g. to point(SHA256 (ENCODE(G))).

Every content provided with verification key-value R (further called Verification Key) can be used for verification purposes, A verification key is provided as part of the content and can be dynamically verified. Security attestations of the specific type can be aggregated together to provide overall app-level commitments, company-level commitments, and overall commitments.

More specifically, referring to FIG. 1, at an overall level 100, security attestation commitments 102 are associated with a service level signature 104. At a company level 200, the security attestation commitments 102 are associated with a company level signature 204, which maps back to the security attestation commitments 102. Also at the company level 200 are searchable commitments 206, which also map back to the security attestation commitments 102. At a software version level 300, the security level commitments 102 are verified by attestation signatures 304. Searchable commitments 206 are also present at the software version level 300. As illustrated at the software version level 300, a searchable commitment 206 involves factors such as a name of the organization 310, a software version 312, a URL identifier 314, and one or more attributes 316 of the software. Further at the software version level 300, the security attestation commitments 102 involve the use of a V0-code hash 318, UUIDS 320 of security scans, and V1-security attestations 322. Security attestation commitments 102 can be signed by third-party security providers, which increases the trust level in the attestations. In an embodiment, Schnorr signatures can be used, which are known to those of skill in the art.

Figure 2:
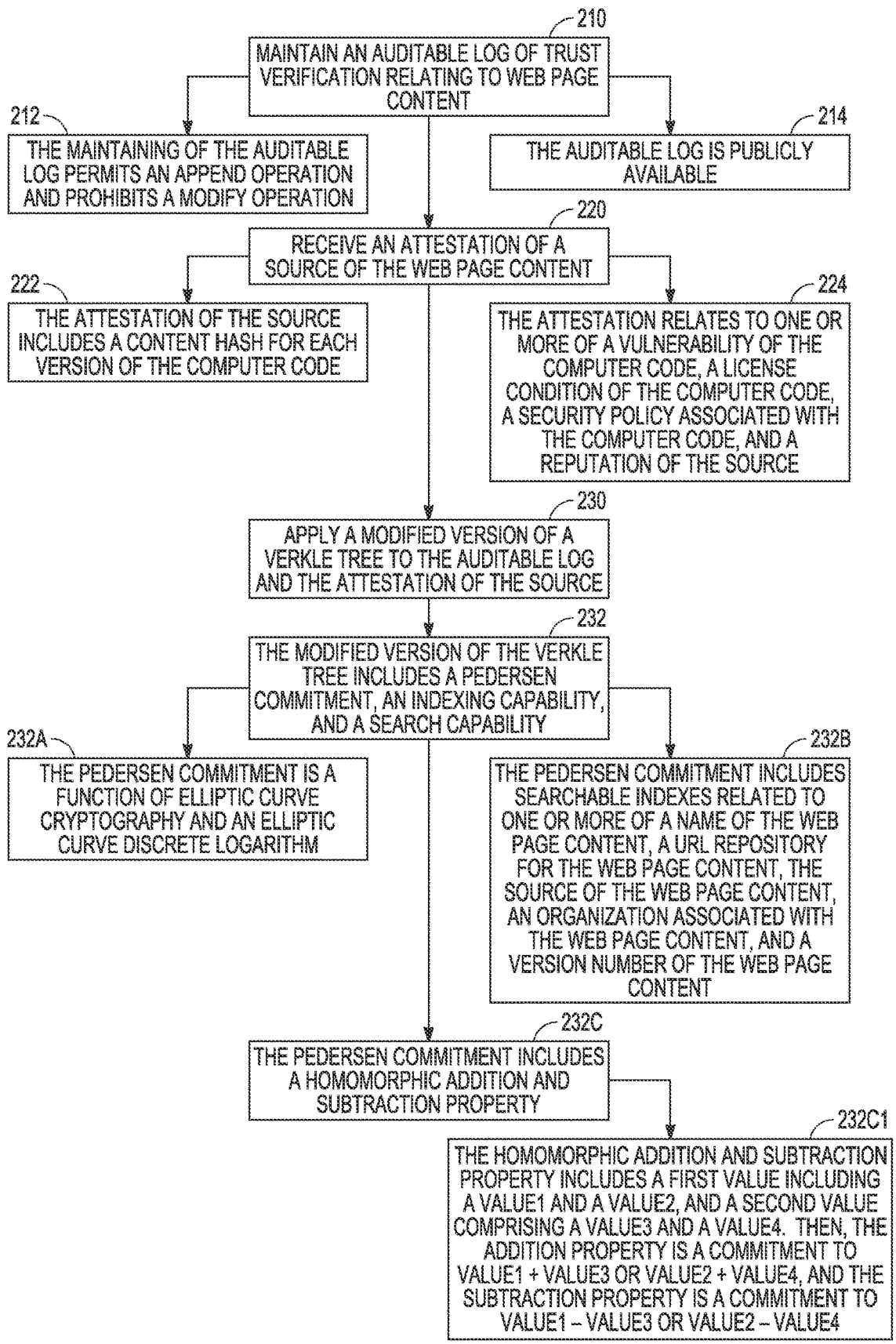
FIG. 2 is a block diagram illustrating operations and features of a process to validate web content using a transparent web content validation tree.

FIG. 2 is a block diagram illustrating example embodiments of operations and features of a system and method for managing web page content. FIG. 2 includes a number of process and feature blocks 210-232C1. Though arranged substantially serially in the example of FIG. 2, other examples may reorder the blocks, omit one or more blocks, and/or execute two or more blocks in parallel using multiple processors or a single processor organized as two or more virtual machines or sub-processors.

Referring now specifically to FIG. 2, at 210, an auditable log of trust verification relating to web page content is maintained. As noted at 212, the maintaining of the auditable log permits an append operation and prohibits a modify operation. As noted at 214, the auditable log is publicly available, thereby permitting a third party to verify correctness of the auditable log and to monitor when new content is added to the auditable log.

At 220, an attestation of a source of the web page content is received. The attestation relates to a security practice of the source, computer code provided by the source, a reputation of the source, and a history of the source. As noted at 222, the attestation of the source comprises a content hash for each version of the computer code. As noted at 224, the attestation relates to one or more of a vulnerability of the computer code, a license condition of the computer code, a security policy associated with the computer code, and a reputation of the source.

At 230, a modified version of a Verkle Tree is applied to the auditable log and the attestation of the source. As noted at 232, the modified version of the Verkle Tree includes a Pedersen commitment, an indexing capability, and a search capability, and as noted at 232A, the Pedersen commitment is a function of elliptic curve cryptography and an elliptic curve discrete logarithm. At 232B, the Pedersen commitment includes searchable indexes related to one or more of a name of the web page content, a URL repository for the web page content, the source of the web page content, an organization associated with the web page content, and a version number of the web page content. At 232C, the Pedersen commitment comprises a homomorphic addition and subtraction property. At 232C1, the homomorphic addition and subtraction property includes a first value including a value1 and a value2, and a second value including a value3 and a value4. Then, the addition property is a commitment to value1+value3 or value2+value4, and the subtraction property is a commitment to value1−value3 or value2−value4.

Figure 3:
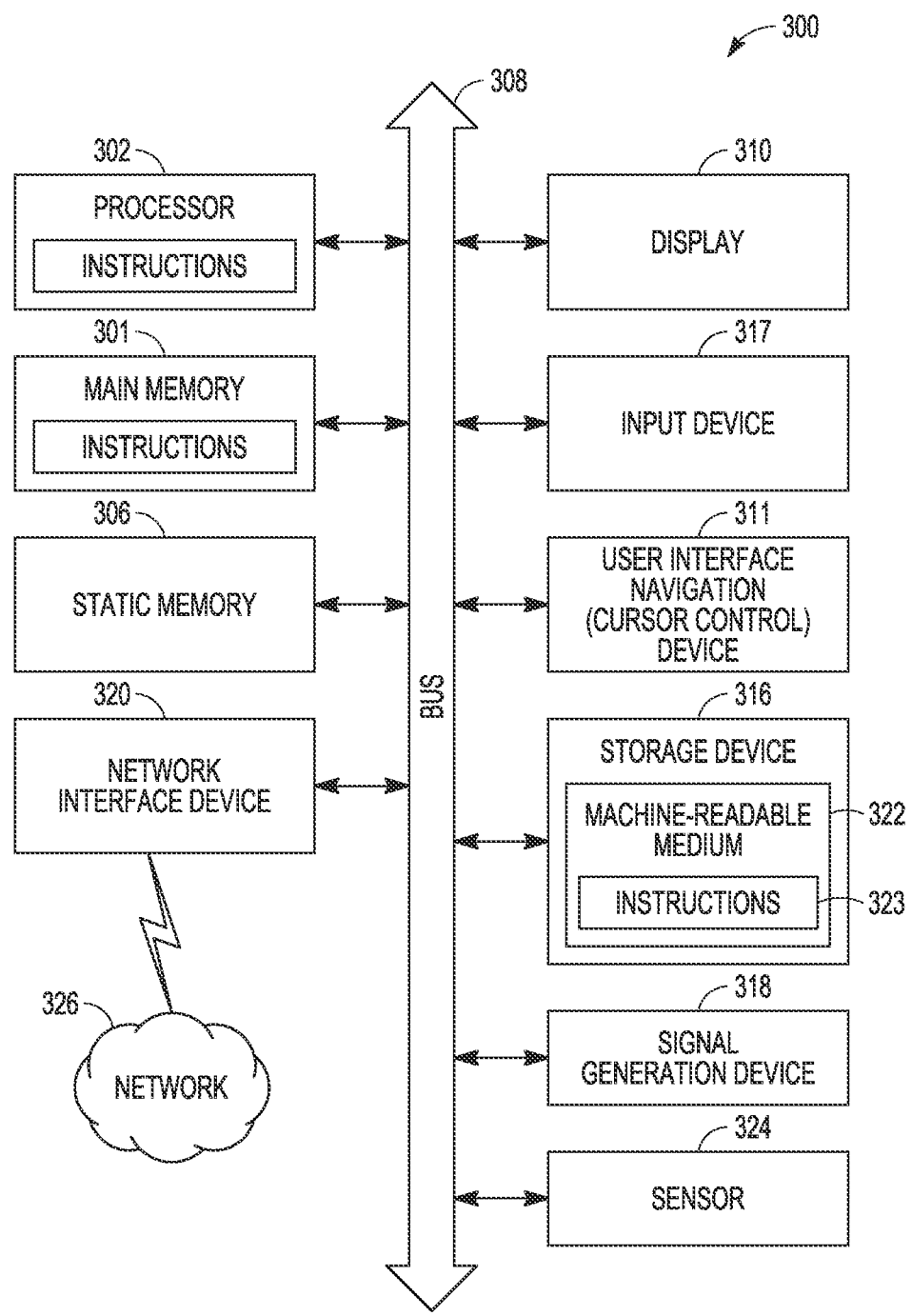
FIG. 3 is a block diagram of a computer architecture upon which one or more of the embodiments disclosed herein can execute.

FIG. 3 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 300 includes a processor 302 (e.g., a central processing unit (CPU), a graphics processing unit (GPU) or both), a main memory 301 and a static memory 306, which communicate with each other via a bus 308. The computer system 300 may further include a display unit 310, an alphanumeric input device 317 (e.g., a keyboard), and a user interface (UI) navigation device 311 (e.g., a mouse). In one embodiment, the display, input device and cursor control device are a touch screen display. The computer system 300 may additionally include a storage device 316 (e.g., drive unit), a signal generation device 318 (e.g., a speaker), and a network interface device 320, and one or more sensors 324, such as a global positioning system sensor, compass, accelerometer, or other sensor.

The drive unit 316 includes a machine-readable medium 322 on which is stored one or more sets of instructions and data structures (e.g., software 323) embodying or utilized by any one or more of the methodologies or functions described herein. The software 323 may also reside, completely or at least partially, within the main memory 301 and/or within the processor 302 during execution thereof by the computer system 300, the main memory 301 and the processor 302 also constituting machine-readable media.

While the machine-readable medium 322 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 323 may further be transmitted or received over a communications network 326 using a transmission medium via the network interface device 320 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

The above detailed description includes references to the accompanying drawings, which form a part of the detailed description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the appended claims, along with the full scope of equivalents to which such claims are entitled.

EXAMPLES

Example No. 1 is a process to manage web page content comprising: maintaining an auditable log of trust verification relating to the web page content; receiving an attestation of a source of the web page content, the attestation relating to a security practice of the source, computer code provided by the source, a reputation of the source, and a history of the source; and applying a modified version of a Verkle Tree to the auditable log and the attestation of the source.

Example No. 2 includes all the features of Example No. 1, and optionally includes a process wherein the maintaining of the auditable log permits an append operation and prohibits a modify operation.

Example No. 3 includes all the features of Example Nos. 1-2, and optionally includes a process wherein the attestation of the source comprises a content hash for each version of the computer code.

Example No. 4 includes all the features of Example Nos. 1-3, and optionally includes a process wherein the attestation relates to one or more of a vulnerability of the computer code, a license condition of the computer code, a security policy associated with the computer code, and a reputation of the source.

Example No. 5 includes all the features of Example Nos. 1-4, and optionally includes a process wherein the auditable log is publicly available, thereby permitting a third party to verify correctness of the auditable log and to monitor when new content is added to the auditable log.

Example No. 6 includes all the features of Example Nos. 1-5, and optionally includes a process wherein the modified version of the Verkle Tree comprises a Pedersen commitment, an indexing capability, and a search capability.

Example No. 7 includes all the features of Example Nos. 1-6, and optionally includes a process wherein the Pedersen commitment is a function of elliptic curve cryptography and an elliptic curve discrete logarithm.

Example No. 8 includes all the features of Example Nos. 1-7, and optionally includes a process wherein the Pedersen commitment comprises searchable indexes related to one or more of a name of the web page content, a URL repository for the web page content, the source of the web page content, an organization associated with the web page content, and a version number of the web page content.

Example No. 9 includes all the features of Example Nos. 1-8, and optionally includes a process wherein the Pedersen commitment comprises a homomorphic addition and subtraction property.

Example No. 10 includes all the features of Example Nos. 1-9, and optionally includes a process wherein the homomorphic addition and subtraction property comprises: a first value comprising a value1 and a value2; and a second value comprising a value3 and a value4; wherein the addition property comprises a commitment to value1+value3 or value2+value4; and wherein the subtraction property comprises a commitment to value1−value3 or value2−value4.

Example No. 11 is a machine-readable medium comprising instructions that when executed by a processor execute a process to manage web page content, the process comprising: maintaining an auditable log of trust verification relating to the web page content; receiving an attestation of a source of the web page content, the attestation relating to a security practice of the source, computer code provided by the source, a reputation of the source, and a history of the source; and applying a modified version of a Verkle Tree to the auditable log and the attestation of the source.

Example No. 12 includes all the features of Example No. 11, and optionally includes a machine-readable medium wherein the maintaining of the auditable log permits an append operation and prohibits a modify operation.

Example No. 13 includes all the features of Example Nos. 11-12, and optionally includes a machine-readable medium wherein the attestation of the source comprises a content hash for each version of the computer code.

Example No. 14 includes all the features of Example Nos. 11-13, and optionally includes a machine-readable medium wherein the attestation relates to one or more of a vulnerability of the computer code, a license condition of the computer code, a security policy associated with the computer code, and a reputation of the source.

Example No. 15 includes all the features of Example Nos. 11-14, and optionally includes a machine-readable medium wherein the auditable log is publicly available, thereby permitting a third party to verify correctness of the auditable log and to monitor when new content is added to the auditable log.

Example No. 16 includes all the features of Example Nos. 11-15, and optionally includes a machine-readable medium wherein the modified version of the Verkle Tree comprises a Pedersen commitment, an indexing capability, and a search capability.

Example No. 17 includes all the features of Example Nos. 11-16, and optionally includes a machine-readable medium wherein the Pedersen commitment is a function of elliptic curve cryptography and an elliptic curve discrete logarithm.

Example No. 18 includes all the features of Example Nos. 11-17, and optionally includes a machine-readable medium wherein the Pedersen commitment comprises searchable indexes related to one or more of a name of the web page content, a URL repository for the web page content, the source of the web page content, an organization associated with the web page content, and a version number of the web page content.

Example No. 19 includes all the features of Example Nos. 11-18, and optionally includes a machine-readable medium wherein the Pedersen commitment comprises a homomorphic addition and subtraction property; and wherein the homomorphic addition and subtraction property comprises: a first value comprising a value1 and a value2; and a second value comprising a value3 and a value4; wherein the addition property comprises a commitment to value1+value3 or value2+value4; and wherein the subtraction property comprises a commitment to value1−value3 or value2−value4.

Example No. 20 is a system comprising a computer processor; and a memory coupled to the computer processor; wherein the computer processor and the memory are operable for managing web page content by maintaining an auditable log of trust verification relating to the web page content; receiving an attestation of a source of the web page content, the attestation relating to a security practice of the source, computer code provided by the source, a reputation of the source, and a history of the source; and applying a modified version of a Verkle Tree to the auditable log and the attestation of the source.

The invention claimed is:

1. A process to manage web page content comprising:
   maintaining an auditable log of trust verification relating to the web page content;
   receiving an attestation of a source of the web page content, the attestation relating to a security practice of the source, computer code provided by the source, a reputation of the source, and a history of the source; and
   applying a modified version of a Verkle Tree to the auditable log and the attestation of the source;
   wherein the modified version of the Verkle Tree comprises a Pedersen commitment, an indexing capability, and a search capability;
   wherein the Pedersen commitment comprises a homomorphic addition and subtraction property;
   wherein the homomorphic addition and subtraction property comprises:
      a first value comprising a value1 and a value2; and
      a second value comprising a value3 and a value4;
   wherein the addition property comprises a commitment to value1+value3 or value2+value4; and
   wherein the subtraction property comprises a commitment to value1−value3 or value2−value4.

2. The process of claim 1, wherein the maintaining of the auditable log permits an append operation and prohibits a modify operation.

3. The process of claim 1, wherein the attestation of the source comprises a content hash for each version of the computer code.

4. The process of claim 1, wherein the attestation relates to one or more of a vulnerability of the computer code, a license condition of the computer code, a security policy associated with the computer code, and a reputation of the source.

5. The process of claim 1, wherein the auditable log is publicly available, thereby permitting a third party to verify correctness of the auditable log and to monitor when new content is added to the auditable log.

6. The process of claim 1, wherein the Pedersen commitment is a function of elliptic curve cryptography and an elliptic curve discrete logarithm.

7. The process of claim 1, wherein the Pedersen commitment comprises searchable indexes related to one or more of a name of the web page content, a URL repository for the web page content, the source of the web page content, an organization associated with the web page content, and a version number of the web page content.

8. A non-transitory machine-readable medium comprising instructions that when executed by a processor execute a process to manage web page content, the process comprising:
   maintaining an auditable log of trust verification relating to the web page content;
   receiving an attestation of a source of the web page content, the attestation relating to a security practice of the source, computer code provided by the source, a reputation of the source, and a history of the source; and
   applying a modified version of a Verkle Tree to the auditable log and the attestation of the source;
   wherein the modified version of the Verkle Tree comprises a Pedersen commitment, an indexing capability, and a search capability;
   wherein the Pedersen commitment comprises a homomorphic addition and subtraction property;
   wherein the homomorphic addition and subtraction property comprises:
   a first value comprising a value1 and a value2; and
   a second value comprising a value3 and a value4;
   wherein the addition property comprises a commitment to value1+value3 or value2+value4; and
   wherein the subtraction property comprises a commitment to value1−value3 or value2−value4.

9. The non-transitory machine-readable medium of claim 8, wherein the maintaining of the auditable log permits an append operation and prohibits a modify operation.

10. The non-transitory machine-readable medium of claim 8, wherein the attestation of the source comprises a content hash for each version of the computer code.

11. The non-transitory machine-readable medium of claim 8, wherein the attestation relates to one or more of a vulnerability of the computer code, a license condition of the computer code, a security policy associated with the computer code, and a reputation of the source.

12. The non-transitory machine-readable medium of claim 8, wherein the auditable log is publicly available, thereby permitting a third party to verify correctness of the auditable log and to monitor when new content is added to the auditable log.

13. The non-transitory machine-readable medium of claim 8, wherein the Pedersen commitment is a function of elliptic curve cryptography and an elliptic curve discrete logarithm.

14. The non-transitory machine-readable medium of claim 8, wherein the Pedersen commitment comprises searchable indexes related to one or more of a name of the web page content, a URL repository for the web page content, the source of the web page content, an organization associated with the web page content, and a version number of the web page content.

15. A system comprising:
   a computer processor; and
   a memory coupled to the computer processor,
   wherein the computer processor and the memory are operable for managing web page content by:
   maintaining an auditable log of trust verification relating to the web page content;
   receiving an attestation of a source of the web page content, the attestation relating to a security practice of the source, computer code provided by the source, a reputation of the source, and a history of the source; and
   applying a modified version of a Verkle Tree to the auditable log and the attestation of the source;
   wherein the modified version of the Verkle Tree comprises a Pedersen commitment, an indexing capability, and a search capability;
   wherein the Pedersen commitment comprises a homomorphic addition and subtraction property;
   wherein the homomorphic addition and subtraction property comprises:
   a first value comprising a value1 and a value2; and
   a second value comprising a value3 and a value4;
   wherein the addition property comprises a commitment to value1+value3 or value2+value4; and
wherein the subtraction property comprises a commitment to value1−value3 or value2−value4.

* * * * *